United States Patent
Cai et al.

(10) Patent No.: US 12,270,756 B2
(45) Date of Patent: Apr. 8, 2025

(54) DEVICE FOR COLLABORATIVE DETECTION OF CARBON AND NITROGEN EMISSIONS AND METHOD THEREOF

(71) Applicant: Jiangsu Normal University, Xuzhou (CN)

(72) Inventors: Tingdong Cai, Xuzhou (CN); Guangzhen Gao, Xuzhou (CN)

(*) Notice: Subject to any disclaimer, the term of this patent is extended or adjusted under 35 U.S.C. 154(b) by 0 days.

(21) Appl. No.: 18/810,526

(22) Filed: Aug. 21, 2024

(65) Prior Publication Data
US 2025/0085217 A1    Mar. 13, 2025

Related U.S. Application Data

(63) Continuation of application No. PCT/CN2023/127242, filed on Oct. 27, 2023.

(51) Int. Cl.
   *G01N 21/39*    (2006.01)
   *G01N 21/31*    (2006.01)

(52) U.S. Cl.
   CPC ......... *G01N 21/3103* (2013.01); *G01N 21/39* (2013.01); *G01N 2021/396* (2013.01); *G01N 2201/068* (2013.01)

(58) Field of Classification Search
   CPC .............. G01N 21/3103; G01N 21/39; G01N 2021/396; G01N 2201/068
   See application file for complete search history.

(56) References Cited

U.S. PATENT DOCUMENTS

| | | | |
|---|---|---|---|
| 8,149,407 | B1 | 4/2012 | Rao |
| 2020/0141805 | A1 | 5/2020 | Duraffourg et al. |

FOREIGN PATENT DOCUMENTS

| | | |
|---|---|---|
| CN | 105277503 A | 1/2016 |
| CN | 106402664 A | 2/2017 |

(Continued)

OTHER PUBLICATIONS

"Multi-laser sensor for simultaneous multi-gas measurements using off-axis cavity-enhanced absorption spectroscopy with an opposite two-way configuration", Optics Letters vol. 47, Issue 6, pp. 1339-1342 (2022) by Gao et al. (Year: 2022).*

(Continued)

*Primary Examiner* — Jamil Ahmed
(74) *Attorney, Agent, or Firm* — CAIP; Xia Li

(57) ABSTRACT

A device for collaborative detection of carbon and nitrogen emissions and a method thereof are provided. The device includes an integrating cavity, a single beam laser and a dual beam hybrid laser set at opposite ends of the integrating cavity, and an information acquisition and analysis system. The single beam laser and the dual beam hybrid laser are respectively used to continuously emit and transmit laser beams into the integrating cavity. The single beam laser and the dual beam hybrid laser can achieve simultaneous spatio-temporal high-frequency detection of any concentration of $CO_2$—$CH_4$—$N_2O$—$N_2$ mixed gas in one integrating cavity, and the concentration of $CO_2$, $CH_4$, and $N_2O$ can be inverted through the information acquisition and analysis system. This device meets the research demand for simultaneous detection of multiple greenhouse gases under the same path, greatly improving the utilization efficiency of the integrating cavity and saving detection costs.

3 Claims, 2 Drawing Sheets

(56) References Cited

FOREIGN PATENT DOCUMENTS

| | | |
|---|---|---|
| CN | 107389609 A | 11/2017 |
| CN | 116380838 A | 7/2023 |
| WO | 2013119320 A1 | 8/2013 |

OTHER PUBLICATIONS

Internation Search Report of PCT/CN2023/127242 Mailed Jun. 6, 2024.

Guangzheng Gao et al. "Multi-laser sensor for simulating multi-gas measurements using off-axis cavity-enhance absorption spectroscopy with an opposite two-way configuration", Optics letters, vol. 31, Issue 23, Mar. 3, 2022 (Mar. 3, 2022), pp. 1339-1342 and Figure 1.

* cited by examiner

DEVICE FOR COLLABORATIVE DETECTION OF CARBON AND NITROGEN EMISSIONS AND METHOD THEREOF

CROSS-REFERENCE TO RELATED APPLICATIONS

This application is a continuation of International Application No. PCT/CN2023/127242 with a filling date of Oct. 27, 2023, designating the United states, now pending, and further claims to the benefit of priority from Chinese Application No. 202311156952.8 with a filing date of Sep. 8, 2023. The content of the aforementioned applications, including any intervening amendments thereto, are incorporated herein by reference.

TECHNICAL FIELD

The present invention relates to the technical field of environmental gas detection, in particular to a device for collaborative detection of carbon and nitrogen emissions and a method thereof.

BACKGROUND

There are numerous emission sources of carbon dioxide, methane, and nitrous oxide, which coexist in many emission processes. Therefore, it is of great significance to develop methods with high detection sensitivity, high-frequency response characteristics, and high selectivity that can identify and measure the three main greenhouse gases within the same time and space.

P. Mahesh et al. and Gonzalez-Valencia R et al. respectively conduct measurement on the $CO_2$ and $CH_4$ in the atmosphere and freshwater ecosystems simultaneously, using LGR's gas analysis equipment based on off-axis integrated cavity output spectroscopy (OA-ICOS) technology. The measurement baselines for $CO_2$ and $CH_4$ were on the order of $10^{-7}$ and $10^{-10}$, respectively. D. L. Arévalo-Martínez et al. also used relevant equipment from LGR to simultaneously detect carbon dioxide and nitrous oxide in the ocean and atmosphere. K. Wang et al. used off-axis cavity enhanced absorption spectroscopy (OA-CEAS) based on time-division multiplexing technology to simultaneously detect methane and carbon dioxide components in the atmosphere. The cavity enhanced absorption spectroscopy technology uses a high reflectivity dielectric cavity mirror, which enables it to achieve higher detection sensitivity through more reflections, facilitating isotope detection without enrichment. However, currently, off-axis cavity enhanced absorption spectroscopy technology uses traditional beam unidirectional transmission detection mode, which makes it difficult for two or more beams to be coupled to a single integrating cavity at the same time, resulting in current research only focusing on detecting one of the greenhouse gas $CO_2$, $CH_4$, and $N_2O$. Only a few studies involve simultaneous detection of both, and no relevant reports have been found on using OA-CEAS to detect three greenhouse gases $CO_2$, $CH_4$, and $N_2O$, in the same integrating cavity in the same time and space.

For this purpose, an embodiment of the present invention provides a bidirectional off-axis cavity enhanced absorption OA-CEAS device for high-frequency measurement of multiple gas components in the same time and space, to partially solve the technical problems of low utilization efficiency of the integrating cavity and high detection cost in the field of multiple gas detection in the prior art.

SUMMARY

A device for collaborative detection of carbon and nitrogen emissions and a method thereof are provided to address the shortcomings of existing technologies. Based on a bidirectional off-axis cavity enhanced OA-CEAS device, it can achieve simultaneous spatio-temporal detection of concentrations of $CO_2$, $CH_4$, and $N_2O$ gas molecules and their partial isotope at the sub-ppb level, which solves the current problem that is difficult to use unidirectional beam transmission detection mode to couple two or more beams of light simultaneously into a single integrating cavity for simultaneous detection of multi-component greenhouse gases. This greatly improves the utilization efficiency of the integrating cavity and saves detection costs for achieving simultaneous detection of multiple greenhouse gases under the same path.

In order to achieve the above objective, a carbon and nitrogen emission collaborative detection device is provided by the present invention, which includes an integrating cavity, Two sets of lasers, and an information acquisition and analysis system. The Two sets of lasers are a single beam laser and a dual beam hybrid laser set at opposite ends of the integrating cavity, and the single beam laser and the dual beam hybrid laser are used to continuously emit and transmit laser beams to the integrating cavity, respectively. The Two sets of lasers can be used in one integrating cavity to achieve simultaneous high-frequency detection of $CO_2$—$CH_4$—$N_2O$—$N_2$ mixed gas with any concentration, and to invert the concentrations of $CO_2$, $CH_4$, and $N_2O$ in the $CO_2$—$CH_4$—$N_2O$—$N_2$ mixed gas to be measured.

The two sets of lasers are respectively set at both ends of the integrating cavity, with two concave mirrors between the two sets of lasers and the integrating cavity, respectively. The two sets of lasers continuously emit and transmit in both directions on both sides of the integrating cavity, achieving a bidirectional continuous emission and transmission mode of the integrating cavity, and using denser high-order transverse modes to improve the sensitivity of gas concentration detection.

The integrating cavity includes a gas absorption cell with a $CO_2$—$CH_4$—$N_2O$—$N_2$ mixed gas, the dual beam mixed laser is located at a left end of the gas absorption cell, and the single beam laser is located at a right end of the gas absorption cell, between the dual beam mixed laser and the gas absorption cell. The information acquisition and analysis system is arranged between the single beam laser and the gas absorption cell. The information acquisition and analysis system includes a first concave mirror arranged on an optical path between the dual beam hybrid laser and the gas absorption cell, and a second concave mirror arranged on an optical path between the single beam laser and the gas absorption cell. It further includes a first optical filter and a first photodetector arranged in sequence, a second optical filter and a second photodetector, and the first photodetector and the second photodetector are connected to a computer through a data acquisition card. The first concave mirror and the second concave mirror are respectively provided with incident holes, a concave surface of the first concave mirror and a concave surface of the second concave mirror are both inclined with an angle of about 2° relative to the gas absorption cell, so as to reflect the laser beam passing through the gas absorption cell onto the first optical filter and the second optical filter. The information acquisition and analysis system includes the first concave mirror set on the optical path between the dual beam hybrid laser and the gas absorption cell, the second concave mirror set on the optical path between the single beam laser and the gas absorption cell, the first optical filter and the first photodetector arranged in sequence on the reflected optical path of the first concave mirror, the second optical filter and the second photodetector arranged in sequence on the reflected optical path of the second concave mirror, a data acquisition card connected to the first photodetector and the second photodetector respectively, and a computer connected to the data acquisition card.

The first concave mirror and the second concave mirror are respectively provided with incident holes, the concave surface of the first concave mirror and the concave surface of the second concave mirror are both inclined relative to the gas absorption cell, with a inclined angle about 2°. the concave surface of the first concave mirror is configured to reflect a laser beam passing through the gas absorption cell onto the first optical filter, and the concave surface of the second concave mirror reflects a laser beam passing through the gas absorption cell onto the second optical filter.

By using the first concave mirror and the second concave mirror to reflect the laser emitted by two sets of lasers multiple times, the effective path length of the laser in the gas absorption cell is increased, achieving measurement of gas with lower concentrations. At the same time, the laser collected by the photodetector is the laser emitted by the laser located on the other side of the corresponding gas absorption cell. The laser on the same side of the photodetector is filtered by a optical filter and will not be collected.

Specifically, the first concave mirror allows a laser of the dual beam hybrid laser to pass through the incident hole and enter the gas absorption cell, the concave surface of the first concave mirror reflects the light reflected by the gas absorption cell to the first optical filter, the laser beam within a band range of the first optical filter passes through the first optical filter and enter the first photodetector, and the laser beam outside the band range of the first optical filter is reflected back into the gas absorption cell according to the original path. The second concave mirror allows the laser of the single beam laser to pass through the incident hole and enter the gas absorption cell, while reflecting the light feedback from the gas absorption cell to the second optical filter. During this process, the laser beam within a band range of the second optical filter passes through the second optical filter and enter the second photodetector, and the laser beam outside band range of the second optical filter is reflected back into the gas absorption cell according to the original path.

The wavelength ranges of the first optical filter and the second optical filter are different, a wavelength of a laser beam emitted by the dual beam hybrid laser is within the wavelength range of the first optical filter, while a wavelength of a laser beam emitted by the single beam laser is within the wavelength range of the second optical filter.

During this process, the laser beam within the wavelength range of the second optical filter will pass through the second optical filter and enter the second photodetector. The laser beam of the laser outside the wavelength range of the second optical filter will be reflected back into the gas absorption cell along the original path. During this process, the first optical filter reflects the light reflected back by the first concave mirror on the left side of the gas absorption cell, which is emitted from the first quantum cascade laser and the second quantum cascade laser. The second optical filter reflects the laser reflected back by the second concave mirror on the right side of the gas absorption cell, which is emitted from the laser.

Wherein:

The computer collects voltage signals from the first photodetector and/or the second photodetector through the data acquisition card, and the computer inverts and calculates the concentrations of $CO_2$, $CH_4$, $N_2O$ in the $CO_2$—$CH_4$—$N_2O$—$N_2$ mixed gas to be measured based on the voltage signals.

Further, the carbon and nitrogen emission collaborative detection device further includes a sine wave generator, a sawtooth wave generator, an adder, and a collimator. The dual beam hybrid laser includes a first laser controller, a second laser controller, a first quantum cascade laser, a second quantum cascade laser, and a beam combiner.

The outputs of the sine wave generator and the sawtooth wave generator are conducted signal superposition through processing through the adder to generate a laser driving signal. The adder is used to output the laser driving signal to the first laser controller or the second laser controller. The first laser controller is connected to the first quantum cascade laser, and the second laser controller is connected to the second quantum cascade laser. The output ends of the first quantum cascade laser and the second quantum cascade laser are connected to the collimator pointing to the left end of the gas absorption cell through the beam combiner.

Wherein, the sine wave generator is a lock-in amplifier, the sawtooth wave generator is a function generator, the first quantum cascade laser and the second quantum cascade laser are all DFB tunable semiconductor lasers.

Further, the single beam laser includes a third laser controller and a third quantum cascade laser connected to the third laser controller. The adder is used to output the laser driving signal to the third laser controller, and the output end of the third quantum cascade laser points to the right end of the gas absorption cell.

Further, the wavelengths of the laser beams used for testing $CO_2$, $CH_4$, and $N_2O$ are 4353.9 nm, 3211.3 nm, and 4567 nm, respectively. The wavelengths of the laser beams emitted by the first quantum cascade laser, the second quantum cascade laser, and the third quantum cascade laser correspond one-to-one with 4353.9 nm, 3211.3 nm, and 4567 nm, respectively.

Further, the technical parameters of the first photodetector and the second photodetector are: response band of 3000 nm-5000 nm. The technical parameters of the data acquisition card are: 2 channels of 12 bit D/A output, 8 channels of non-phase-difference analog input, 1 channel of 16 bit counter, and 16 channels of programmable switch quantity.

Further, the three lasers are the first quantum cascade laser, the second quantum cascade laser, and the third quantum cascade laser, all of which are DFB tunable semiconductor lasers.

Further, the first laser controller outputs a driving current signal driven by a laser driving signal to control the output of the first quantum cascade laser, and/or the second laser controller outputs a driving current signal driven by a laser driving signal to control the output of the second quantum cascade laser, and/or the third laser controller outputs a driving current signal driven by a laser driving signal to control the output of the third quantum cascade laser. The capacitor in bias tee is used to filter out the DC bias in Gaussian white noise signals, and superimpose the broadband high-frequency white noise signal of 5 MHz-2 GHZ, −10 dBm emitted by the white noise source with the driving current signal to prevent the laser injection current from being biased and to protect the normal operation of the laser device group.

Further, white noise source includes a lock-in amplifier, a signal generator, and a RF noise source.

The lock-in amplifier and signal generator superimpose the signals through the adder to form a laser driving signal. The RF noise source adds RF noise with a power of −10 dBm under the laser driving signal. The RF noise is filtered by a low-pass filter and input into the bias tee together with the driving current signal. After passing through the bias tee, the driving current signal superimposed with RF noise is used to control the operation of the first quantum cascade laser, the second quantum cascade laser, or the third quantum cascade lase.

Wherein, the modulation signal of the laser device includes two parts:

A portion of the modulation signal is serve as the laser driving signal, which is formed from the superposition of the sine wave generated by the lock-in amplifier and the triangular wave generated by the signal generator by the adder. This portion of the modulation signal is sent to at least one of the first laser controller, the second laser controller, and the third laser controller; and The other portion of the modulation signal is the white noise signal emitted by the RF noise source. After passing through a low-pass filter, this portion of the modulation signal is superimposed with the driving current signal generated by one of the first laser controller, the second laser controller, and the third laser controller through the bias tee to control the first quantum cascade laser or the second quantum cascade laser.

The signal obtained by superimposing sine wave and triangular wave through the adder is used to achieve wavelength modulation of the signals, while the white noise signal emitted by the RF noise source is used to suppress the cavity mode noise of the integrating cavity.

Further, both the first concave mirror and the second concave mirror are silver coated concave spherical mirrors.

Further, the length of the gas absorption cell is 30 cm.

A detection method for the carbon and nitrogen emission collaborative detection device, including the following steps:

Filling the gas absorption cell with a mixture of gases to be measured, including $CO_2$ (carbon dioxide), $CH_4$ (methane), $N_2O$ (nitrous oxide), and $N_2$ (nitrogen);

Connecting the output terminals of the sine wave generator and the sawtooth wave generator to the adder and the input terminal of the data acquisition card, respectively;

Connecting the output terminal of the adder to the input terminal of the first laser controller, the input terminal of the second laser controller, or the input terminal of the third laser controller 6;

Wherein the output terminal of the first laser controller is connected to the first quantum cascade laser, and the output terminal of the second laser controller is connected to the second quantum cascade laser; the laser beams output by the first quantum cascade laser and the second quantum cascade laser are combined by a collimator, and the light passing through the collimator sequentially passes through the first concave mirror, the gas absorption cell, the second concave mirror, the first optical filter, and the first photodetector; and The output terminal of the third laser controller is connected to the third quantum cascade laser, the laser beam output by the third quantum cascade laser passes through the collimator, then sequentially passes through the second concave mirror, the gas absorption cell, the first concave mirror, and the second optical filter, and then enters into the second photodetector;

Loading a high-frequency sine wave modulation signal into at least one inject current of the first laser controller, the second laser controller, and the third laser controller, so that the laser beam output by at least one of the first laser controller, the second laser controller, and the third laser controller oscillates sinusoidally near its optical frequency; when demodulating the signal, extracting the signal with a narrow bandwidth near the second harmonic of the modulation frequency;

Loading a low-frequency sawtooth wave into at least one inject current of the first laser controller, the second laser controller, and the third laser controller to inject current, so that the center wavelength output by the dual beam hybrid laser can completely scan the gas absorption spectrum line;

The output terminals of the first photodetector and the second photodetector are both connected to the input terminal of the data acquisition card, and the output terminal of the data acquisition card is connected to the input terminal of the computer, the two absorbed light signals are converted into voltage signals by the first photodetector and the second photodetector, then collected by the data acquisition card, and then the computer uses LabVIEW software to obtain the signals through the data acquisition card and sends them to digital phase-locked; the voltage signals detected by the first photodetector and the second photodetector are demodulated according to the different modulation frequencies of the dual beam hybrid laser and the single beam laser; wavelet denoising and Kalman filtering processing of the second harmonic signal obtained by conducting demodulation at the second harmonic frequency using a lock-in amplifier according to the corresponding modulation frequency, so as to obtain the second harmonic signals of $CO_2$, $CH_4$, and $N_2O$ absorption spectral lines;

Wherein the modulation frequency parameters for the dual beam hybrid laser and the single beam laser are 30 Hz, 1V sawtooth wave superimposed with 12 kHz, 150 mV sine wave, and 10 Hz, 100 mV sawtooth wave superimposed with 8 kHz, 50 mV sine wave, respectively;

Testing a series of absorption spectral lines of $CO_2$—$CH_4$—$N_2O$—$N_2$ mixed gas with different concentrations within the set range of the dual beam hybrid laser and the single beam laser, selecting spectral line pairs with high correlation, then establishing a relationship model between the peak to peak value of the second harmonic and the corresponding concentration for these spectral line pairs, then simulating the direct absorption of the corresponding gas and the second harmonic signal, and then fitting them with the actual measured signal to obtain the following corresponding models: $Y_{CO2}=1.827X_{CO2}+0.189$, $Y_{CH4}=0.00286X_{CH4}+0.30475$, $Y_{N2O}=0.185X_{N2O}+0.208$, wherein Y represents the corresponding gas concentration, X represents the peak to peak value of the second harmonic. By measuring any concentration of $CO_2$—$CH_4$—$N_2O$—$N_2$ mixed gas, the relationship model between the peak to peak value of the second harmonic and the corresponding concentration can be used to invert the concentration of at least one gas in $CO_2$, $CH_4$, and $N_2O$.

A collaborative measurement method for carbon and nitrogen emission gas concentration of a carbon and nitrogen emission collaborative detection device, including the following steps:

Step A, determining optimal structural parameters for a curvature radius of the first concave mirror, a curvature radius of the second concave mirror, a distance and an angle between the concave mirror and a cavity mirror in the integrating cavity, and optimal positions of the first photodetector and the second photodetector through an optical design software;

Step B, establishing atmospheric transmittance models for $CO_2$, $CH_4$, $N_2O$ and their selected isotope molecules, and selecting spectral detection windows and target spectral line combinations suitable for simultaneous detection of $CO_2$, $CH_4$, and $N_2O$ greenhouse gases and their selected isotope molecules;

Step C, using the dual beam hybrid laser and the single beam laser respectively receive superimposed signals of high-frequency sine waves and low-frequency triangular waves for operation to generate laser beams separately, wherein the high-frequency sine waves are generated by a sine wave generator, and the low-frequency triangular waves generated by the sawtooth wave generator, wherein a first quantum cascade laser and a second quantum cascade laser with similar wavelengths are placed on the same side of the dual beam hybrid laser, two laser beams from the first quantum cascade laser and the second quantum cascade laser are coupled by a fiber optic coupler, after being collimated by a collimator, then coupled into the integrating cavity at appropriate positions and off-axis angles through the incident hole on the concave mirror on the same side of the integrating cavity; the third quantum cascade laser of the single beam laser is set on the other side of the integrating cavity, after being collimated by a collimator, laser beams from the third quantum cascade laser then coupled into the integrating cavity through the incident hole on the concave mirror on the same side of the integrating cavity at an appropriate position and off-axis angle; the two coupled laser beams enter from both sides of the integrating cavity, then pass through the integrating cavity with the gas to be detected separately, then are focused and reflected by the concave mirror on one side of the exit cavity mirror, then pass through a narrow band-pass filter of the corresponding wavelength to filter out opposing beams, and then are received by photodetectors and demodulated by a lock-in amplifier to obtain two spectral lines corresponding to $CO_2$ (These two spectral lines correspond to $^{16}O^{12}C^{16}O$ and $^{16}O^{13}C^{16}O$, respectively), two spectral lines corresponding to $CH_4$ (These two spectral lines correspond to $^{12}CH_4$ and $^{13}CH_4$, respectively), and three spectral lines corresponding to $N_2O$ (These three spectral lines correspond to $^{14}N_2^{16}O$, $^{14}N^{15}N_{16}O$, and $^{15}N^{14}N_{16}O$, respectively);

Step D, removing background signals for the two second harmonic signals corresponding to $CO_2$, the two second harmonic signals corresponding to $CH_4$, and the three second harmonic signals corresponding to $N_2O$ corresponding to the target greenhouse gas obtained to obtain absorption related signals corresponding to the seven spectral lines, and using a wavelet denoising method to reduce noises in a WMS-2f signal measured by the photodetector;

Step E, based on the pressure and temperature information inside the integrating cavity, obtaining the absorption state signals of $CO_2$, $CH_4$, and $N_2O$ corresponding to the second harmonic signals of the spectral lines under the same temperature and pressure environment;

Step F, performing inversion calculations on peaks of absorption related signals corresponding to $CO_2$, $CH_4$, $N_2O$, and their selected isotopes to obtain the concentrations of $CO_2$, $CH_4$, and $N_2O$, respectively.

Further, in step A, the optimal structural parameters are determined using the following method:

Using Matlab to simulate and analyze the intracavity light field using a decentered Gaussian beam, the intracavity light field in bi-directional mode can be described by the sum of the incident light fields on both sides:

$$\hat{E}(x, y, z) = \hat{E}(x_1, y_1, z_1) + \hat{E}(x_2, y_2, z_2)$$

$$\hat{E}(x_i, y_i, z_j) = \left(\frac{2}{\pi}\right)^{1/2} \cdot \frac{\hat{q}_0}{\omega \hat{q}(z_i)} \exp\left(-jkz_i - jk\frac{(x_i - \hat{p}_{x_i})^2 + (y_i - \hat{p}_{y_i})^2}{2\hat{q}(z_i)}\right),$$

At this point, the light field of any N times reflected light spots on the cavity mirror can be calculated from the light field matrix M of the first light spot:

$$\begin{bmatrix} A & B \\ C & D \end{bmatrix} = M^N M, \, M = \begin{bmatrix} 1 & d \\ 0 & 1 \end{bmatrix}\begin{bmatrix} 1 & 0 \\ -2/r & 1 \end{bmatrix}\begin{bmatrix} 1 & d \\ 0 & 1 \end{bmatrix}\begin{bmatrix} 1 & 0 \\ -2/r & 1 \end{bmatrix}, \, M' = \begin{bmatrix} 1 & d \\ 0 & 1 \end{bmatrix}$$

By calculating the vector sum of all light spots on the cavity mirror, the total light field emitted by the cavity mirror on one side of the integrating cavity can be obtained:

$$\hat{E}_{out}(x, y) = \sum_{n=0}^{+\infty} \hat{E}_{0,n} t^2 \cdot r^{2n} \cdot \exp(-jkd - jk \cdot 2nd) \cdot \exp\left(-jk\frac{(x - \hat{p}_{x,n})^2 + (y - \hat{p}_{y,n})^2}{2\hat{q}_n}\right),$$

Further, the transmittance spectrum on one side of the integrating cavity is obtained from the output and input power:

$$T_{cav}(v) = \frac{p_{out}(v)}{p_{in}(v)} = \frac{\iint I_{out} dxdy}{\iint I_{in} dxdy} = \frac{\iint \hat{E}_{out} \hat{E}_{out}^* dxdy}{\iint \hat{E}_{in} \hat{E}_{in}^* dxdy},$$

In order to improve computational efficiency, the cavity mirror will be divided into a series of grids during the simulation process. During the calculation, only the light field at the grid points can be considered, and the total power can be obtained by multiplying the irradiance at the grid points by the area of the grid. Here, by changing parameters such as cavity length, cavity mirror curvature radius, incident beam diameter, off-axis angle of incident light on both sides, and incident position, the Airy function will be used to simulate and analyze the intracavity light field and transmittance spectrum under various conditions. Combined with the balance between the optimal optical path length and the optimal signal-to-noise ratio, the optimal structural parameters for bidirectional coupling detection mode will be obtained.

Further, the selection of target spectral lines in step B follows the standard that is suitable for the spectral detection window and the target spectral line combination for simultaneous detection of $CO_2$, $CH_4$, and $N_2O$ molecules and isotopic molecules are:

Step B1, the selected absorption spectral line combinations for $CO_2$, $CH_4$, and $N_2O$ molecules and their isotopes are required to distribute within the range of 2 $cm^{-1}$, so as to ensure full coverage through a single scan of the laser;

Step B2, based on the distribution of absorption bands of each molecule and its isotopes, analyzing the leading mixing effect between each band to ensure that the spacing between spectral lines within each combination is not less than 0.1 $cm^{-1}$, so as to ensure that spectral line mixing under normal pressure does not affect measurement accuracy;

Step B3, the strengths of absorption spectral lines of each combination is required as high as possible to ensure that the system has good detection sensitivity;

Step B4, considering the abundance of each molecular isotope, the absorption depth of each spectral line within the combination is required not differ too much, ensuring that all detection spectral lines have a good signal-to-noise ratio;

Step B5, within each spectral line combination, ensuring there is not absorption interference from other molecules with higher concentrations in the atmosphere as possible;

Step B6, the lower energy level of each selected spectral line is required as small as possible, so as to effectively reduce the impact of spectral line strength changes caused by environmental temperature changes on measurement accuracy.

Further, the inversion of concentration in step F is as follows:

Step F1, performing vacuum treatment on the integrating cavity, and using $CO_2$, $CH_4$, $N_2O$, and $N_2$ to prepare $CO_2$—$CH_4$—$N_2O$—$N_2$ mixed gases with different concentrations, filling the integrating cavity with mixed gases of carbon dioxide-methane-nitrous oxide-nitrogen ($CO_2$—$CH_4$—$N_2O$—$N_2$) of 450 ppm-2 ppm-0.4 ppm, 600 ppm-3 ppm-0.5 ppm, 700 ppm-4 ppm-0.6 ppm, 800 ppm-5 ppm-0.7 ppm, and 900 ppm-6 ppm-0.8 ppm, respectively;

Step F2, synchronously collecting emitted signals, triangular wave signals, and sine wave signals after multiple reflections of the mixed gas, demodulating the collected signals from the integrating cavity at the corresponding sine wave modulation frequency to obtain the second harmonic signals of the $CO_2$—$CH_4$—$N_2O$—$N_2$ mixed gas;

Step F3, calibrating the system: providing the relationship between the peak height of the second harmonic signal and the concentration at the 5 concentrations in step F1; performing polynomial fitting on the peak height at 5 concentrations obtained in step F1 to obtain a calibration formula:

$$X = -1.2722 + 65.3014 X P - 504.2734 X P^2 + 2444.9629 X P^3;$$

In the formula, X represents the corresponding gas concentration, P represents the peak to peak value of the second harmonic wave, and the peak to peak value of the second harmonic wave represents the peak height of the WMS-2f signal. Parameter obtainment: First, calibrating the system with a set of known gas concentrations to obtain the relationship between the peak height and concentration of the WMS-2f signal (referred to as the calibration formula). During measurement, the inversion of the measured gas concentration is achieved through a calibration formula. The experiment measured five concentrations of $CO_2$—$CH_4$—$N_2O$—$N_2$ mixed gas and calibrated the system. The relationship between the peak height of the WMS-2f signal and the concentration obtained at the above 5 concentrations was obtained, with a linear correlation of R2=0.991. The peak heights at all measured concentrations were fitted with a cubic polynomial, and the correlation coefficient obtained from the fitting was R2=0.996;

At this point, the calibration of the system has been completed, and the calibration formula obtained is a cubic polynomial as follows:

$$X = -1.2537 + 58.4574 \times P - 498.1725 \times P^2 + 2322.4533 \times P^3,$$

Step F4, measuring any concentration of $CO_2$—$CH_4$—$N_2O$—$N_2$ mixed gas, and using the calibration formula in step F3 to invert the concentration of at least one gas of $CO_2$, $CH_4$, and $N_2O$ in the $CO_2$—$CH_4$—$N_2O$—$N_2$ mixed gas to be measured.

Beneficial Effects:

1. The present invention utilizes an integrating cavity based on bidirectional cavity enhancement mode to achieve detection of three greenhouse gases $CO_2$, $CH_4$, and $N_2O$, as well as some isotopes, under the same time and space, greatly improving the utilization efficiency of the integrating cavity with fast response time, saving detection costs, and expanding the application range of OA-CEAS equipment.

2. In this device, wavelength modulation absorption spectroscopy technology assisted by frequency division multiplexing is used for detection, which can achieve simultaneous coupling of multiple lasers in the same integrating cavity.

3. By placing a concave mirror, the light beam reflected back from the first concave mirror is reflected back into the integrating cavity, playing a role in re injecting light intensity.

4. By using longitudinal mode noise suppression technology based on RF white noise disturbance laser operating linewidth, the modulation current of RF white noise disturbance laser is utilized to weaken the coherence of the laser by changing its output spectral linewidth. This weakens or even disappears the interference effect when the beam coincides in the cavity, causing the laser to lose the possibility of coupling resonance with the integrating cavity, thereby suppressing noise and improving signal-to-noise ratio. The introduction of frequency division multiplexing technology and wavelength modulation technology can greatly improve the detection sensitivity of the system. These characteristics not only improve the detection performance of the system, but also effectively reduce the measurement cost of the system.

Advantages: The bidirectional transmission mode in the integrating cavity helps to improve detection sensitivity by utilizing more dense higher-order transverse modes. However, due to the narrow linewidth of the laser, a large number of longitudinal modes are also generated in the integrating cavity. Therefore, when multiple lasers work together, longitudinal mode noise will be intensified. This provides a longitudinal mode noise suppression technology based on RF white noise disturbance of the laser working linewidth, which weakens the coherence of the laser by utilizing the modulation current of the RF white noise disturbance laser and changing its output spectral linewidth, therefore, it weakens or even disappears the interference effect when the beam coincides in the cavity, causing the laser to lose the possibility of coupling resonance with the integrating cavity. The signal output by the RF white noise source is filtered by a low-pass filter and input into the laser circuit through bias tee, together with the controller, it controls the output of the laser to change the linewidth of its output spectrum. The variation relationship between the working linewidth of the laser, the integrating cavity mode noise, and the signal-to-noise ratio of the integrated output signal will be analyzed through a combination of theory and experiment to obtain the optimal RF noise modulation parameters at different powers and frequencies of white noise.

Figure 1:
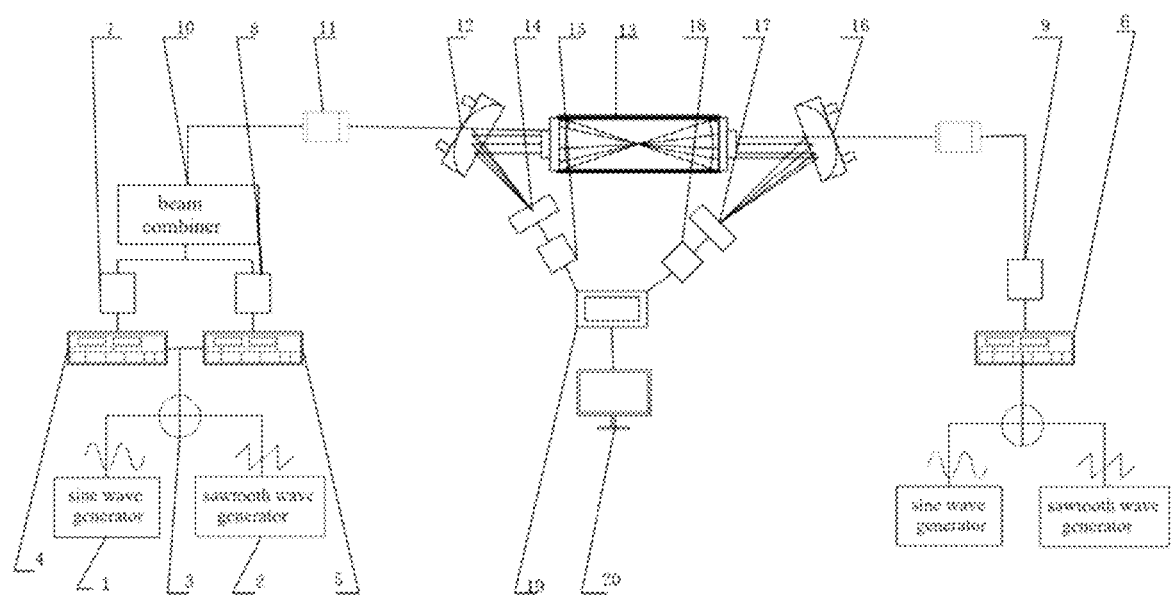
FIG. 1 is a schematic diagram of the structure of a device for collaborative detection of carbon and nitrogen emissions.

Reference marks in the figures: 1—sine wave generator, 2—sawtooth wave generator, 3—adder, 4—first laser controller, 5—second laser controller, 6—third laser controller, 7—first quantum cascade laser, 8—second quantum cascade laser, 9—third quantum cascade laser, 10—beam combiner, 11—collimator, 12—first concave mirror, 13—gas absorption pool, 14—first optical filter, 15—first photodetector, 16—second concave mirror, 17—second optical filter, 18—second photodetector, 19—data acquisition card, 20—computer.

DETAILED DESCRIPTION OF THE EMBODIMENTS

To achieve simultaneous detection of all molecules and their isotopes with detection by accurately selecting detection spectral lines using two set of lasers, the present invention provides a carbon and nitrogen emission collaborative detection device that can achieve simultaneous, spatio-temporal, and high-frequency detection of three important greenhouse gases, $CO_2$ (carbon dioxide), $CH_4$ (methane), and $N_2O$ (nitrous oxide), within the same integrating cavity.

The present invention adopts the following technical solution: a carbon and nitrogen emission collaborative detection device that simultaneously monitors three gases: $CO_2$, $CH_4$, and $N_2O$.

The carbon and nitrogen emission collaborative detection device includes an integrating cavity, a single beam laser and a dual beam hybrid laser set at opposite ends of the integrating cavity, and an information acquisition and analysis system, wherein the single beam laser and the dual beam hybrid laser are used to continuously emit and transmit laser beams to the integrating cavity, respectively. The integrating cavity includes a gas absorption cell with a $CO_2$—$CH_4$—$N_2O$—$N_2$ mixed gas, the dual beam mixed laser is located at the left end of the gas absorption cell, and the single beam laser is located at the right end of the gas absorption cell. The information acquisition and analysis system includes a first concave mirror arranged on an optical path between the dual beam hybrid laser and the gas absorption cell, a second concave mirror arranged on an optical path between the single beam laser and the gas absorption cell, a first optical filter and a first photodetector arranged in sequence on a reflected light path of the first concave mirror, a second optical filter and a second photodetector arranged in sequence on a reflected light path of the second concave mirror, a data acquisition card connected to the first photodetector and the second photodetector respectively, and a computer connected to the data acquisition card. The first concave mirror and the second concave mirror are respectively provided with incident holes, a concave surface of the first concave mirror and a concave surface of the second concave mirror are both inclined relative to the gas absorption cell, the concave surface of the first concave mirror is configured to reflect a laser beam passing through the gas absorption cell onto the optical filter, and the concave surface of the second concave mirror reflects a laser beam passing through the gas absorption cell onto the second optical filter. The first concave mirror allows a laser of the dual beam hybrid laser to pass through the incident hole and enter the gas absorption cell, the concave surface of the first concave mirror reflects the light reflected by the gas absorption cell to the first optical filter, the laser beam within a band range of the first optical filter passes through the first optical filter and enter the first photodetector, and the laser beam outside the band range of the first optical filter is reflected back into the gas absorption cell according to the original path. The second concave mirror allows the laser of the single beam laser to pass through the incident hole and enter the gas absorption cell, while reflecting the light feedback from the gas absorption cell to the second optical filter. During this process, the laser beam within a band range of the second optical filter passes through the second optical filter and enter the second photodetector, and the laser beam outside band range of the second optical filter is reflected back into the gas absorption cell according to the original path. The wavelength ranges of the first optical filter and the second optical filter are different, a wavelength of a laser beam emitted by the dual beam hybrid laser is within the wavelength range of the first optical filter, while a wavelength of a laser beam emitted by the single beam laser is within the wavelength range of the second optical filter.

Wherein:

The computer collects voltage signals from the first photodetector and/or the second photodetector through the data acquisition card, and the computer inverts and calculates the concentrations of $CO_2$, $CH_4$, $N_2O$ in the $CO_2$—$CH_4$—$N_2O$—$N_2$ mixed gas to be measured based on the voltage signals.

The length of the gas absorption cell is 30 cm.

Both the first concave mirror and the second concave mirror are silver coated concave spherical mirrors.

The carbon and nitrogen emission collaborative detection device also includes narrowband filters that can serve as the first optical filter and the second optical filter. The first optical filter corresponding to the wavelength of the opposing laser beam is placed in front of the first photodetector, and the second optical filter corresponding to the wavelength of the opposing laser beam is placed in front of the second photodetector. At the same time, the reflection of the optical filter on the beam outside the bandpass wavelength can be used to reinject and enhance the beam on the local side.

As a preferred technical solution of the present invention, the first quantum cascade laser, the second quantum cascade laser, and the third quantum cascade laser all use DFB tunable semiconductor lasers.

Embodiment 1

Figure 2:
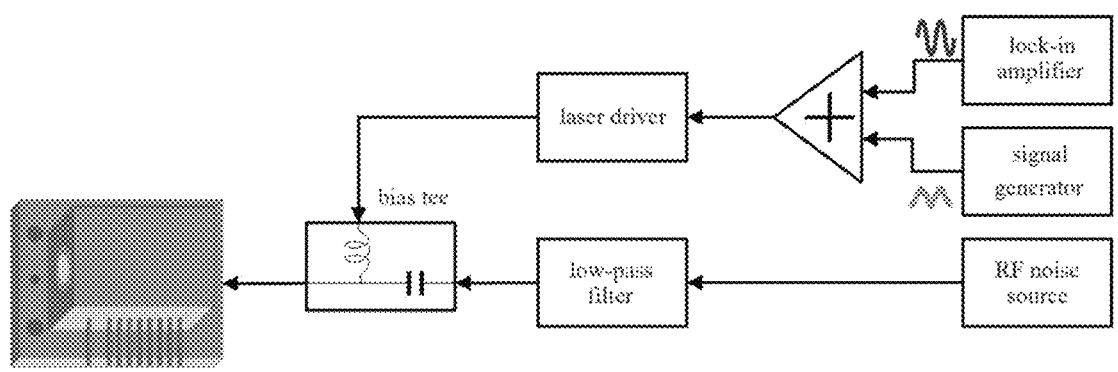
FIG. 2 is a schematic diagram of the noise suppression method used in the dual beam hybrid laser of the present invention.

As shown in FIG. 1 and FIG. 2, the carbon and nitrogen emission collaborative detection device of the present invention includes a laser group, a gas absorption cell, and an information acquisition and analysis system.

Specifically, the carbon and nitrogen emission collaborative detection device further includes a sine wave generator 1, a sawtooth wave generator 2, an adder 3, a first laser controller 4, a second laser controller 5, a third laser controller 6, a first quantum cascade laser 7, a second quantum cascade laser 8, a third quantum cascade laser 9, a beam combiner 10, a collimator 11, a first optical filter 14 and the second optical filter 17. The sine wave generator 1 is a function generator RIGOL, and the technical parameters of DG1000Z1 are: the frequency of the sine wave is 12 kHz, and a function signal generator model F05 can be selected. The technical parameters of the sawtooth wave generator 2 are: the frequency of sawtooth wave is 30 Hz, and a function signal generator with model F05 can be selected. The technical parameters of the laser controller are: temperature adjustment range is 20-30° C., step size is 0.5° C. with accuracy of 0.005° C., current tuning range is 20-110 mA with accuracy of 0.001 mA, and ITC-4002QCL controller can be selected. The technical parameters of the first quantum cascade laser 7: center wavelength is located at 3.3 μm, the maximum output power is 5 mW. The technical parameters of the second quantum cascade laser 8: center wavelength is located at 4.3 μm, the maximum output power is 5 mW. The technical parameters of the third quantum cascade laser 9: the center wavelength is located at 4.5 μm, and the maximum output power is 5 mW.

In this embodiment, the gas absorption cell is filled with a mixture of carbon dioxide, methane, nitrous oxide, and nitrogen gas. The concentrations of carbon dioxide, methane, and nitrous oxide can be calculated by the volume ratios of carbon dioxide, methane, and nitrous oxide, respectively. The long-range gas absorption cell 13 includes a cylindrical cavity made of Pyrex glass material, with a volume of 3.2 L. The end of the cylindrical cavity is equipped with a light inlet and a light outlet. The side of the cylindrical cavity is equipped with an exhaust port and an intake port, both of which are equipped with needle valves. A discrete concave mirror is located near each end of the cylindrical cavity, with a distance of 55 cm between the two discrete concave mirrors.

The information collection and analysis system includes a first photodetector 15, a second photodetector 18, a data acquisition card 19, and a computer 20. The technical parameters of the first photodetector 15 and the second photodetector 18: the response band is 1200-1800 nm, and the 2011 InGaAs photodetector can be selected. The technical parameters of data acquisition card 19: PCI bus is used and supports plug and play, with 2 channels of 12 bit D/A output, 8 channels of non-phase-difference analog input, 1 channel of 16 bit counter, and 16 channels of programmable switch quantity. The acquisition conversion can support multiple triggering forms and can use AC6115 data acquisition card.

Working Principle:
Working Principle of the Present Invention:

Step F1, performing vacuum treatment on an integrating cavity, preparing different concentrations of carbon dioxide-methane-nitrous oxide-nitrogen ($CO_2$—$CH_4$—$N_2O$—$N_2$) mixed gases using carbon dioxide gas, methane gas, nitrous oxide gas, and high-purity nitrogen gas, filling the integrating cavity with mixed gases of carbon dioxide-methane-nitrous oxide-nitrogen ($CO_2$—$CH_4$—$N_2O$—$N_2$) of 450 ppm-2 ppm-0.4 ppm, 600 ppm-3 ppm-0.5 ppm, 700 ppm-4 ppm-0.6 ppm, 800 ppm-5 ppm-0.7 ppm, and 900 ppm-6 ppm-0.8 ppm, respectively;

Step F2, synchronously collecting emitted signals, triangular wave signals, and sine wave signals after multiple reflections of the samples, demodulating the collected signals from the integrating cavity at the corresponding sine wave modulation frequency to obtain the second harmonic signals of the target gas;

Step F3, calibrating the system, providing the relationship between the peak height of the second harmonic signal and the concentration at the 5 concentrations in step F1; performing polynomial fitting on the peak height at all concentrations obtained to obtain a calibration formula;

Step F4, measuring any concentration of $CO_2$—$CH_4$—$N_2O$—$N_2$ mixed gas, and using the calibration formula in step F3 to invert the concentration of at least one gas of $CO_2$, $CH_4$, and $N_2O$ in the $CO_2$—$CH_4$—$N_2O$—$N_2$ mixed gas to be measured.

The output terminals of the sine wave generator 1 and the sawtooth wave generator 2 are respectively connected to the input terminals of the adder 3 and the data acquisition card 19. The output terminal of the adder 3 is connected to the input terminal of the first laser controller 4. The output terminal of the first laser controller 4 is connected to the first quantum cascade laser 7, and the output terminal of the second laser controller 5 is connected to the second quantum cascade laser 8. The output lights of the first quantum cascade laser 7 and the second quantum cascade laser 8 pass through the collimator 10, then the light after passing through the collimator 10 passes through the first concave mirror 12, the gas absorption cell 13, the second concave mirror 16, the first optical filter 14, and the first photodetector 15 in sequence. The output terminal of the third laser controller 6 is connected to the third quantum cascade laser 9. After passing through the collimator, the output light of the third quantum cascade laser 9 passes through the second concave mirror 16, the gas absorption cell 13, the first concave mirror 12, the second optical filter 17, and the second photodetector 18 in sequence. The output terminals of the first photodetector and the second photodetector are both connected to the input terminal of the data acquisition card, and the output terminal of the data acquisition card is connected to the input terminal of the computer. The present invention uses frequency division multiplexing technology and wavelength modulation spectroscopy technology. The implementation method is to load a high-frequency sine wave modulation signal into the injection current of the laser, causing the laser output to oscillate sinusoidally near its optical frequency. When demodulating the signal, only narrow bandwidth signals near the second harmonic wave of the modulation frequency are extracted, and the tuning range is achieved near the absorption spectral line of the target gas. This effectively suppresses noise signals in most other frequency bands, greatly improving the signal-to-noise ratio.

At the same time, a lower frequency sawtooth wave is simultaneously loaded into the injection current of the laser, allowing the center wavelength of the laser output to fully scan the gas absorption spectrum. The two absorbed light signals are converted into voltage signals by the photodetector and collected by the data acquisition card, and finally sent to the computer 20 for processing. Using LabVIEW to obtain signals through the data acquisition card and send them to digital phase-locked, the signals are demodulated according to the different modulation frequencies of two lasers. Subsequently, the collected signals are subjected to wavelet denoising and Kalman filtering to obtain the second harmonic signals of each detection spectral line.

Firstly, conducting a series test of $CO_2$—$CH_4$—$N_2O$—$N_2$ mixed gas spectral lines with different concentrations within the set range of the laser, selecting some spectral line pairs with high correlation, establishing models for these spectral line pairs, then inverting the concentrations of carbon monoxide and methane to obtain calibration formula, and then conducting measurement on any concentration of $CO_2$—$CH_4$—$N_2O$—$N_2$ mixed gas using the calibration formula, so as to invert the concentrations of $CO_2$, $CH_4$, $N_2O$ and other gases to be measured.

Figure 3:
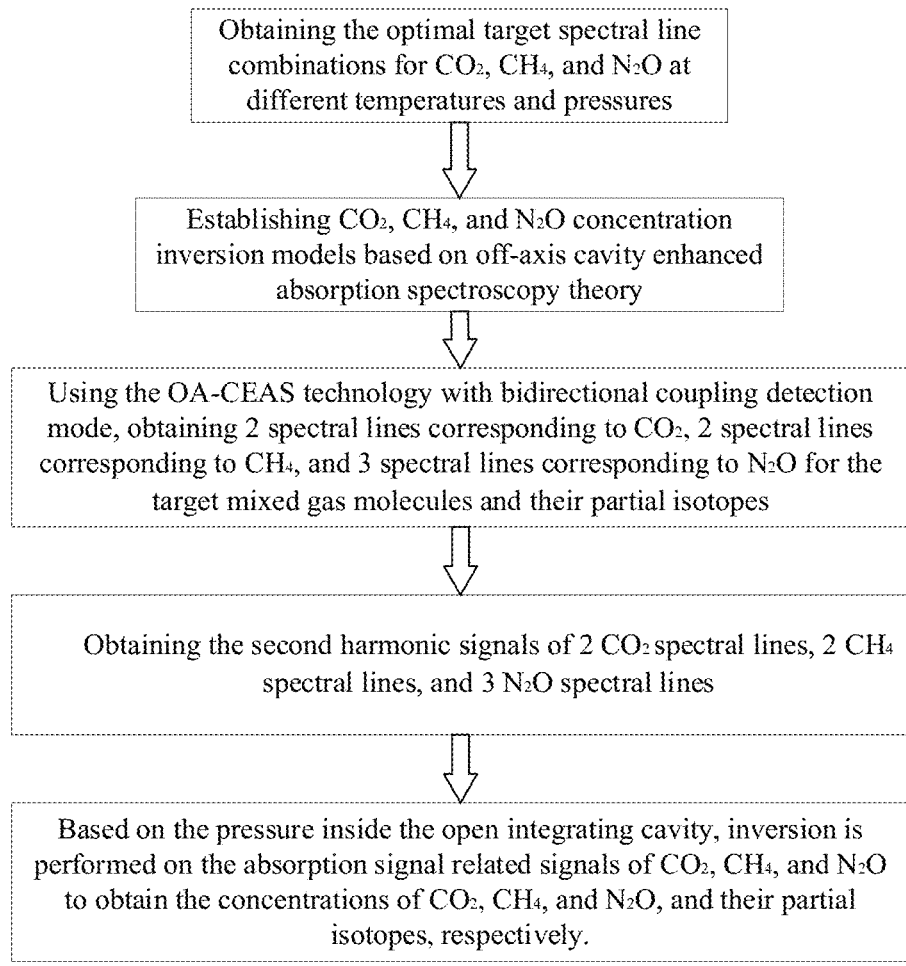
FIG. 3 is a schematic diagram of a method for collaborative measurement of carbon and nitrogen emissions of the present invention.

As shown in FIG. 3, a collaborative measurement method for carbon and nitrogen emission gas concentration is provided by the present invention, which includes the following steps:

Step A, determining optimal structural parameters for a curvature radius of the first concave mirror, a curvature radius of the second concave mirror, a distance and an angle between the concave mirror and a cavity mirror in the integrating cavity, and optimal positions of the first photodetector and the second photodetector through an optical design software;

Step B, establishing atmospheric transmittance models for $CO_2$, $CH_4$, $N_2O$ and their selected isotope molecules, and selecting spectral detection windows and target spectral line combinations suitable for simultaneous detection of $CO_2$, $CH_4$, and $N_2O$ greenhouse gases and their selected isotope molecules;

Step C, using the dual beam hybrid laser and the single beam laser respectively receive superimposed signals of high-frequency sine waves and low-frequency triangular waves for operation to generate laser beams separately, wherein the high-frequency sine waves are generated by a sine wave generator, and the low-frequency triangular waves generated by the sawtooth wave generator, wherein a first quantum cascade laser and a second quantum cascade laser with similar wavelengths are placed on the same side of the dual beam hybrid laser, two laser beams from the first quantum cascade laser and the second quantum cascade laser are coupled by a fiber optic coupler, after being collimated by a collimator, then coupled into the integrating cavity at appropriate positions and off-axis angles through the incident hole on the concave mirror on the same side of the integrating cavity; the third quantum cascade laser of the single beam laser is set on the other side of the integrating cavity, after being collimated by a collimator, laser beams from the third quantum cascade laser then coupled into the integrating cavity through the incident hole on the concave mirror on the same side of the integrating cavity at an appropriate position and off-axis angle; the two coupled laser beams enter from both sides of the integrating cavity, then pass through the integrating cavity with the gas to be detected separately, then are focused and reflected by the concave mirror on one side of the exit cavity mirror, then pass through a narrow band-pass filter of the corresponding wavelength to filter out opposing beams, and then are received by photodetectors and demodulated by a lock-in amplifier to obtain two spectral lines corresponding to $CO_2$ (These two spectral lines correspond to $^{16}O^{12}C^{16}O$ and $^{16}O^{13}C^{16}O$, respectively), two spectral lines corresponding to $CH_4$ (These two spectral lines correspond to $^{12}CH_4$ and $^{13}CH_4$, respectively), and three spectral lines corresponding to $N_2O$ (These three spectral lines correspond to $^{14}N_2^{16}O$, $^{14}N^{15}N^{16}O$, and $^{15}N^{14}N^{16}O$, respectively);

Step D, removing background signals for the two second harmonic signals corresponding to $CO_2$, the two second harmonic signals corresponding to $CH_4$, and the three second harmonic signals corresponding to $N_2O$ corresponding to the target greenhouse gas obtained to obtain absorption related signals corresponding to the seven spectral lines, and using a wavelet denoising method to reduce noises in a WMS-2f signal measured by the photodetector;

Step E, based on the pressure and temperature information inside the integrating cavity, obtaining the absorption state signals of $CO_2$, $CH_4$, and $N_2$ corresponding to the second harmonic signals of the spectral lines under the same temperature and pressure environment;

Step F, performing inversion calculations on peaks of absorption related signals corresponding to the selected isotopes of $CO_2$, $CH_4$, $N_2O$ to obtain their concentrations, respectively.

Further, in step A, the optimal structural parameters are determined using the following method:

Using Matlab to simulate and analyze the intracavity light field using a decentered Gaussian beam, the intracavity light field in bi-directional mode can be described by the sum of the incident light fields on both sides:

$$\hat{E}(x, y, z) = \hat{E}(x_1, y_1, z_1) + \hat{E}(x_2, y_2, z_2)$$

$$\hat{E}(x_i, y_i, z_j) = \left(\frac{2}{\pi}\right)^{1/2} \cdot \frac{\hat{q}_0}{\omega \hat{q}(z_i)} \exp\left(-jk z_i - jk \frac{(x_i - \hat{p}_{x_i})^2 + (y_i - \hat{p}_{y_i})^2}{2\hat{q}(z_i)}\right),$$

At this point, the light field of any N times reflected light spots on the cavity mirror can be calculated from the light field matrix M of the first light spot:

$$\begin{bmatrix} A & B \\ C & D \end{bmatrix} = M^N M', \quad M = \begin{bmatrix} 1 & d \\ 0 & 1 \end{bmatrix}\begin{bmatrix} 1 & 0 \\ -2/r & 1 \end{bmatrix}\begin{bmatrix} 1 & d \\ 0 & 1 \end{bmatrix}\begin{bmatrix} 1 & 0 \\ -2/r & 1 \end{bmatrix}, \quad M' = \begin{bmatrix} 1 & d \\ 0 & 1 \end{bmatrix},$$

By calculating the vector sum of all light spots on the cavity mirror, the total light field emitted by the cavity mirror on one side of the integrating cavity can be obtained:

$$\hat{E}_{out}(x, y) = \sum_{n=0}^{+\infty} \hat{E}_{0,n} t^2 \cdot r^{2n} \cdot \exp(-jkd - jk \cdot 2nd) \cdot \exp\left(-jk \frac{(x - \hat{p}_{x,n})^2 + (y - \hat{p}_{y,n})^2}{2\hat{q}_n}\right),$$

Further, the transmittance spectrum on one side of the integrating cavity is obtained from the output and input power:

$$T_{cav}(\upsilon) = \frac{p_{out}(\upsilon)}{p_{in}(\upsilon)} = \frac{\iint I_{out} dx dy}{\iint I_{in} dx dy} = \frac{\iint \hat{E}_{out} \hat{E}_{out}^* dx dy}{\iint \hat{E}_{in} \hat{E}_{in}^* dx dy},$$

In order to improve computational efficiency, the cavity mirror will be divided into a series of grids during the simulation process. During the calculation, only the light field at the grid points can be considered, and the total power can be obtained by multiplying the irradiance at the grid points by the area of the grid. Here, by changing parameters such as cavity length, cavity mirror curvature radius, incident beam diameter, off-axis angle of incident light on both sides, and incident position, the Airy function will be used to simulate and analyze the intracavity light field and transmittance spectrum under various conditions. Combined with the balance between the optimal optical path length and the optimal signal-to-noise ratio, the optimal structural parameters for bidirectional coupling detection mode will be obtained.

Furthermore, specifically, the selection of target spectral lines in step B follows the standard that is suitable for the spectral detection window and the target spectral line combination for simultaneous detection of $CO_2$, $CH_4$, and $N_2O$ molecules and isotopic molecules are:

Step B1, the selected absorption spectral line combinations for $CO_2$, $CH_4$, and $N_2O$ molecules and their isotopes are required to distribute within the range of 2 $cm^{-1}$, so as to ensure full coverage through a single scan of the laser;

Step B2, based on the distribution of absorption bands of each molecule and its isotopes, analyzing the leading mixing effect between each band to ensure that the spacing between spectral lines within each combination is not less than 0.1 $cm^{-1}$, so as to ensure that spectral line mixing under normal pressure does not affect measurement accuracy;

Step B3, the strengths of absorption spectral lines of each combination is required as high as possible to ensure that the system has good detection sensitivity;

Step B4, considering the abundance of each molecular isotope, the absorption depth of each spectral line within the combination is required not differ too much, ensuring that all detection spectral lines have a good signal-to-noise ratio;

Step B5, within each spectral line combination, ensuring there is not absorption interference from other molecules with higher concentrations in the atmosphere as possible;

Step B6, the lower energy level of each selected spectral line is required as small as possible, so as to effectively reduce the impact of spectral line strength changes caused by environmental temperature changes on measurement accuracy.

Further, the inversion of concentration in step F is as follows:

Step F1, performing vacuum treatment on the integrating cavity, and using $CO_2$, $CH_4$, $N_2O$, and $N_2$ to prepare $CO_2$—$CH_4$—$N_2O$—$N_2$ mixed gases with different concentrations, filling the integrating cavity with mixed gases of carbon dioxide-methane-nitrous oxide-nitrogen ($CO_2$—$CH_4$—$N_2O$—$N_2$) of 450 ppm-2 ppm-0.4 ppm, 600 ppm-3 ppm-0.5 ppm, 700 ppm-4 ppm-0.6 ppm, 800 ppm-5 ppm-0.7 ppm, and 900 ppm-6 ppm-0.8 ppm, respectively;

Step F2, synchronously collecting emitted signals, triangular wave signals, and sine wave signals after multiple reflections of the mixed gas, demodulating the collected signals from the integrating cavity at the corresponding sine wave modulation frequency to obtain the second harmonic signals of the $CO_2$—$CH_4$—$N_2O$—$N_2$ mixed gas;

Step F3, calibrating the system: providing the relationship between the peak height of the second harmonic signal and the concentration at the 5 concentrations in step F1; performing polynomial fitting on the peak height at 5 concentrations obtained in step F1 to obtain a calibration formula:

$$X = -1.2722 + 65.3014X\,P - 504.2734X\,P^2 + 2444.9629X\,P^3$$

In the formula, X represents the corresponding gas concentration, P represents the peak to peak value of the second harmonic wave, and the peak to peak value of the second harmonic wave represents the peak height of the WMS-2f signal. Parameter obtainment: First, calibrating the system with a set of known gas concentrations to obtain the relationship between the peak height and concentration of the WMS-2f signal (referred to as the calibration formula). During measurement, the inversion of the measured gas concentration is achieved through a calibration formula. The experiment measured five concentrations of $CO_2$—$CH_4$—$N_2O$—$N_2$ mixed gas and calibrated the system. The relationship between the peak height of the WMS-2f signal and the concentration obtained at the above 5 concentrations was obtained, with a linear correlation of R2=0.991. The peak heights at all measured concentrations were fitted with a cubic polynomial, and the correlation coefficient obtained from the fitting was R2=0.996;

At this point, the calibration of the system has been completed, and the calibration formula obtained is a cubic polynomial as follows:

$$X = -1.2537 + 58.4574 \times P - 498.1725 \times P^2 + 2322.4533 \times P^3,$$

Step F4, measuring any concentration of $CO_2$—$CH_4$—$N_2O$—$N_2$ mixed gas, and using the calibration formula in step F3 to invert the concentration of at least one gas of $CO_2$, $CH_4$, and $N_2O$ in the $CO_2$—$CH_4$—$N_2O$—$N_2$ mixed gas to be measured.

The method for collaborative measurement of carbon and nitrogen emissions designed in the above technical solution, based on the bidirectional coupling detection mode OA-CEAS, can achieve simultaneous detection of the concentrations of three important greenhouse gases $CO_2$, $CH_4$, and $N_2O$, as well as some isotopic molecular gases, at the ppb level. The various technical features of the above embodiments can be combined in any way. To make the description concise, all possible combinations of the various technical features in the above embodiments have not been described. However, as long as there is no contradiction in the combination of these technical features, those combination should be considered within the scope of this specification.

What is claimed is:

1. A collaborative measurement method for carbon and nitrogen emission gas concentration of a carbon and nitrogen emission collaborative detection device, comprising an integrating cavity, a single beam laser and a dual beam hybrid laser set at opposite ends of the integrating cavity, and an information acquisition and analysis system, wherein the single beam laser and the dual beam hybrid laser are used to continuously emit and transmit laser beams to the integrating cavity, respectively;

the integrating cavity comprises a gas absorption cell with a $CO_2$—$CH_4$—$N_2O$—$N_2$ mixed gas, the dual beam mixed laser is located at a left end of the gas absorption cell, and the single beam laser is located at a right end of the gas absorption cell;

the information acquisition and analysis system comprises a first concave mirror arranged on an optical path between the dual beam hybrid laser and the gas absorption cell, a second concave mirror arranged on an optical path between the single beam laser and the gas absorption cell, a first optical filter and a first photodetector arranged in sequence on a reflected light path of the first concave mirror, a second optical filter and a second photodetector arranged in sequence on a reflected light path of the second concave mirror, a data acquisition card connected to the first photodetector and the second photodetector respectively, and a computer connected to the data acquisition card;

the first concave mirror and the second concave mirror are respectively provided with incident holes, a concave surface of the first concave mirror and a concave surface of the second concave mirror are both inclined relative to the gas absorption cell, the concave surface of the first concave mirror is configured to reflect a laser beam passing through the gas absorption cell onto the first optical filter, and the concave surface of the second concave mirror reflects a laser beam passing through the gas absorption cell onto the second optical filter;

the first concave mirror allows a laser of the dual beam hybrid laser to pass through the incident hole and enter the gas absorption cell, the concave surface of the first concave mirror reflects the light reflected by the gas absorption cell to the first optical filter, the laser beam within a band range of the first optical filter passes through the first optical filter and enter the first photodetector, and the laser beam outside the band range of the first optical filter is reflected back into the gas absorption cell according to the original path; the second concave mirror allows the laser of the single beam laser to pass through the incident hole and enter the gas absorption cell, while reflecting the light feedback from the gas absorption cell to the second optical filter; during this process, the laser beam within a band range of the second optical filter passes through the second optical filter and enter the second photodetector, and the laser beam outside band range of the second optical filter is reflected back into the gas absorption cell according to the original path;

wavelength ranges of the first optical filter and the second optical filter are different, a wavelength of a laser beam emitted by the dual beam hybrid laser is within the wavelength range of the first optical filter, while a wavelength of a laser beam emitted by the single beam laser is within the wavelength range of the second optical filter;

wherein:

the computer collects voltage signals from the first photodetector and/or the second photodetector through the data acquisition card, and the computer inverts and calculates the concentrations of $CO_2$, $CH_4$, $N_2O$ in the $CO_2$—$CH_4$—$N_2O$—$N_2$ mixed gas to be measured based on the voltage signals;

characterized in that, the method comprises the following steps:

step A, determining optimal structural parameters for a curvature radius of the first concave mirror, a curvature radius of the second concave mirror, a distance and an angle between the concave mirrors and a cavity mirror in the integrating cavity, and optimal positions of the first photodetector and the second photodetector through an optical design software;

step B, establishing atmospheric transmittance models for $CO_2$, $CH_4$, $N_2O$ and their selected isotope molecules, and selecting spectral detection windows and target spectral line combinations suitable for simultaneous detection of $CO_2$, $CH_4$, and $N_2O$ greenhouse gases;

step C, using the dual beam hybrid laser and the single beam laser respectively receive superimposed signals of high-frequency sine waves and low-frequency triangular waves for operation to generate laser beams separately, wherein the high-frequency sine waves are generated by a sine wave generator, and the low-frequency triangular waves generated by the sawtooth wave generator; a first quantum cascade laser and a second quantum cascade laser with similar wavelengths are placed on the same side of the dual beam hybrid laser, two laser beams from the first quantum cascade laser and the second quantum cascade laser are coupled by a fiber optic coupler, after being collimated by a collimator, then coupled into the integrating cavity at appropriate positions and off-axis angles through the incident hole on the concave mirror on the same side of the integrating cavity; the third quantum cascade laser of the single beam laser is set on the other side of the integrating cavity, after being collimated by a collimator, laser beams from the third quantum cascade laser then coupled into the integrating cavity through the incident hole on the concave mirror on the same side of the integrating cavity at an appropriate position and off-axis angle; the two coupled laser beams enter from both sides of the integrating cavity, then pass through the integrating cavity with the gas to be detected separately, then are focused and reflected by the concave mirror on one side of the exit cavity mirror, filtered out by a narrow band-pass filter of the corresponding wavelength to remove opposing beams, and then are received by photodetectors and demodulated by a lock-in amplifier to obtain two spectral lines corresponding to $CO_2$, two spectral lines corresponding to $CH_4$, and three spectral lines corresponding to $N_2O$;

step D, removing background signals for the two second harmonic signals corresponding to $CO_2$, the two second harmonic signals corresponding to $CH_4$, and the three second harmonic signals corresponding to $N_2O$ corresponding to the target greenhouse gas obtained to obtain absorption related signals corresponding to the seven spectral lines, and using a wavelet denoising method to reduce noises in a WMS-2f signal measured by the photodetector;

step E, based on the pressure and temperature information inside the integrating cavity, obtaining the absorption state signals of $CO_2$, $CH_4$, and $N_2O$ corresponding to the second harmonic signals of the spectral lines under the same temperature and pressure environment;

step F, performing inversion calculations on peaks of absorption related signals corresponding to $CO_2$, $CH_4$, $N_2O$, and their selected isotopes to obtain the concentrations of $CO_2$, $CH_4$, and $N_2O$, respectively.

2. The collaborative measurement method for carbon and nitrogen emission gas concentration according to claim 1, wherein the selection of target spectral lines in step B follows the standard that is suitable for the spectral detection window and target spectral line combination for simultaneous detection of $CO_2$, $CH_4$, and $N_2O$ molecules and isotopic molecules are:

step B1, the selected absorption spectral line combinations for $CO_2$, $CH_4$, and $N_2O$ molecules and their isotopes are required to distribute within the range of 2 $cm^{-1}$;

step B2, based on the distribution of absorption bands of each molecule and its isotopes, analyzing the leading mixing effect between each band to ensure that the spacing between spectral lines within each combination is not less than 0.1 cm$^{-1}$;

step B3, the strengths of absorption spectral lines of each combination is required as high as possible to ensure that the system has good detection sensitivity;

step B4, considering the abundance of each molecular isotope, the absorption depth of each spectral line within the combination is required not differ too much, ensuring that all detection spectral lines have a good signal-to-noise ratio;

step B5, within each spectral line combination, ensuring there is not absorption interference from other molecules with higher concentrations in the atmosphere as possible;

step B6, the lower energy level of each selected spectral line is required as small as possible, so as to effectively reduce the impact of spectral line strength changes caused by environmental temperature changes on measurement accuracy.

3. The collaborative measurement method for carbon and nitrogen emission gas concentration according to claim 2, wherein the inversion of concentration in step F is as follows:

step F1, performing vacuum treatment on the integrating cavity, and using $CO_2$, $CH_4$, $N_2O$, and $N_2$ to prepare $CO_2$—$CH_4$—$N_2O$—$N_2$ mixed gases with different concentrations;

step F2, synchronously collecting emitted signals, triangular wave signals, and sine wave signals after multiple reflections of the mixed gas, demodulating the collected signals from the integrating cavity at the corresponding sine wave modulation frequency to obtain the second harmonic signals of the $CO_2$—$CH_4$—$N_2O$—$N_2$ mixed gas;

step F3, calibrating the system: providing the relationship between the peak height of the second harmonic signal and the concentration at the 5 concentrations in step F1; performing polynomial fitting on the peak height at 5 concentrations obtained in step F1 to obtain a calibration formula; based on the calibration formula, calculating the concentration of at least one gas in $CO_2$, $CH_4$, and $N_2O$ in the $CO_2$—$CH_4$—$N_2O$—$N_2$ mixed gas to be measured;

step F4, measuring $CO_2$—$CH_4$—$N_2O$—$N_2$ mixed gas with any concentration, and applying the calibration formula in step F3 to reverse calculate the concentration of at least one gas in in $CO_2$, $CH_4$, and $N_2O$ in the $CO_2$—$CH_4$—$N_2O$—$N_2$ mixed gas to be measured.

* * * * *